Feb. 20, 1940.  E. ROBERTS  2,191,261
LIQUID COOLED FRICTION RIM
Filed Sept. 10, 1937  2 Sheets-Sheet 2
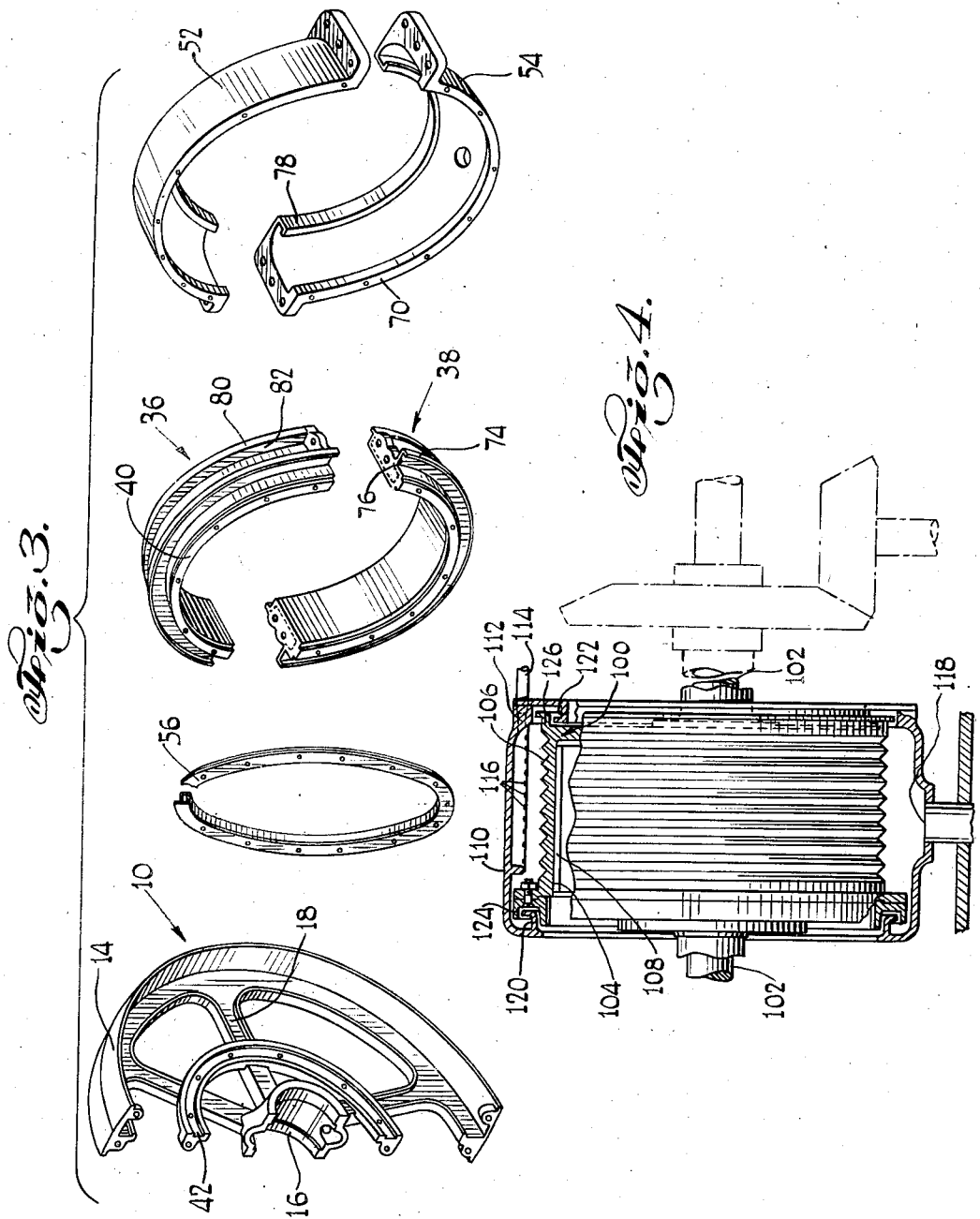
INVENTOR
EUGENE ROBERTS
BY
Hammond & Littell
ATTORNEYS Patented Feb. 20, 1940

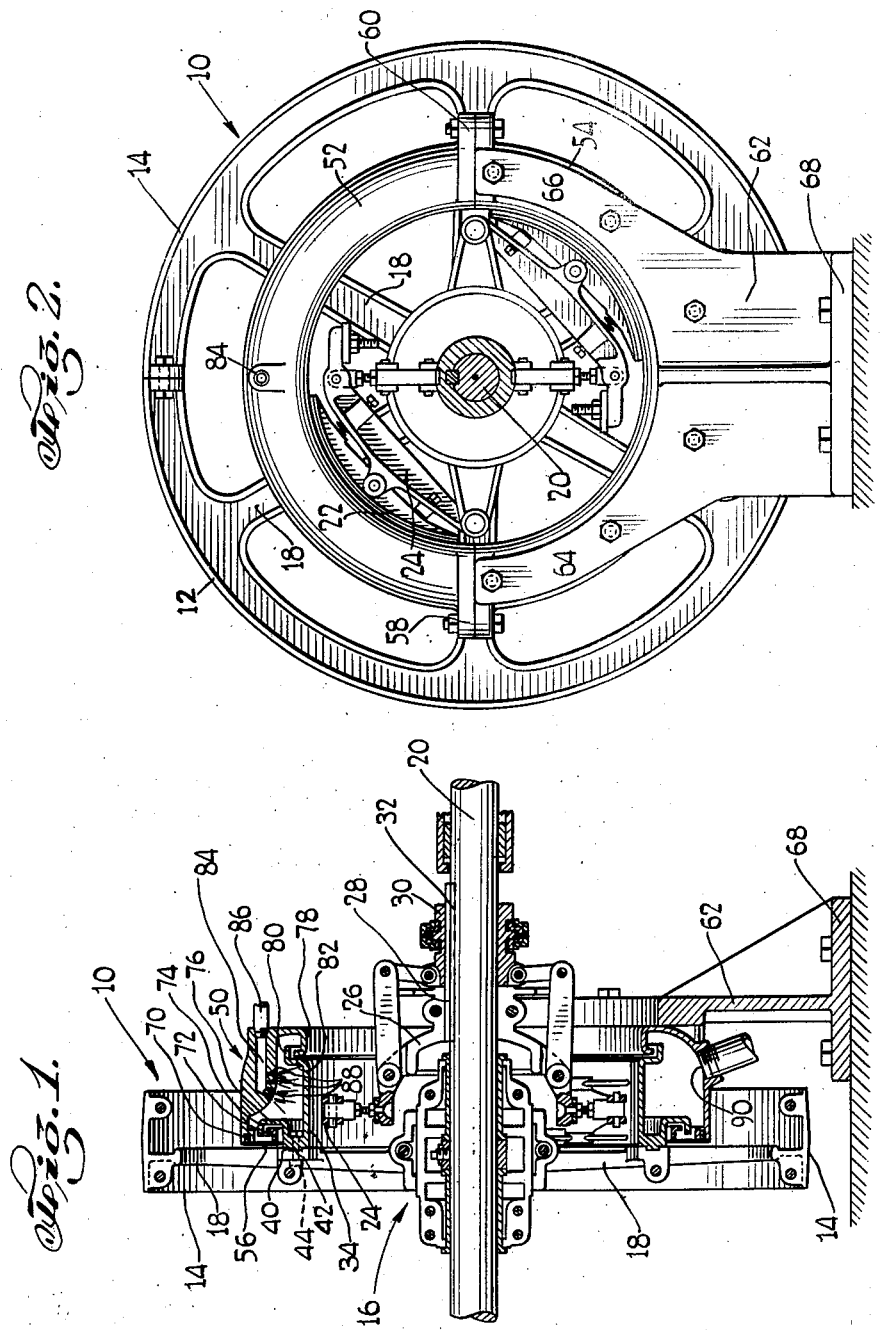

2,191,261

UNITED STATES PATENT OFFICE 2,191,261

LIQUID COOLED FRICTION RIM

Eugene Roberts, Hastings, N. Y., assignor to The Western States Machine Company, New York, N. Y., a corporation of Utah Application September 10, 1937, Serial No. 163,175

5 Claims. (Cl. 192—113)

This invention relates to the cooling of friction rims for clutch and brake mechanisms and the like. It provides improvements of particular importance for use with heavy machinery which operates at high speeds on short operating cycles, with frequent and rapid acceleration and deceleration to and from top speeds.

Certain types of centrifugal machines used in the manufacture of sugar, for example, are now being operated on short cycles of less than three minutes, with acceleration from dead stop to speeds above 1250 R. P. M. in less than one minute and deceleration from top speed within a period of thirty seconds. These centrifugals generally employ drive transmission clutches embodying an annular friction rim and internal, expanding type friction shoes for transmitting strong driving torque from a constantly revolving line shaft to the spindle of the centrifugal. Slippage between the clutch shoes and friction rim during the acceleration stage of each cycle generates a great deal of heat, which, if not dissipated, quickly heats up the friction parts and burns out pads on the clutch shoes. Each occurrence of this sort results in annoying and very costly interruptions to operations.

Clutches and brakes used with machinery of this type heretofore have been provided with certain means for dissipating the heat generated therein by friction. The most common expedient has been to cool the friction parts by controlling the circulation of air in and around the same during operation of the machines. While this is often satisfactory for operations on relatively long cycles, with prolonged acceleration and deceleration, it does not provide sufficient cooling effect for the type of operations referred to above, and within recent years an improved type of construction utilizing a hollow friction rim and means for supplying a stream of cooling liquid thereto, as described in my Letters Patent No. 2,060,826, has been placed in extensive use. The present invention provides another type of cooling which in some respects is superior to that disclosed in said Letters Patent.

Among the objects of this invention are to provide simplified, more efficient and more economical means for the external cooling of friction rims; to provide cooling means which are composed of few parts, which may be adapted easily for use on various types of clutches and the like, and which make it unnecessary to use complicated structure for supplying fresh cooling liquid and disposing of used liquid.

Another object of the invention is to provide an improved method and means for cooling a revolving friction rim which have a high cooling efficiency due to the maintenance of intimate heat exchange between thin, freely vaporizable films of the cooling liquid and the friction rim and which consequently enable perfect cooling of the rim, and with a small volume of liquid.

Another object of the invention is to provide cooling means for revolving friction rims which operates through the application of a spray of cooling liquid to the outer side of the rim and embodies means effectively preventing passage of the liquid to the inside of the rim into contact with operative parts of the machinery.

Still another object of the invention is to provide an improved method and means for cooling revolving friction rims which result in much greater cooling efficiency than systems heretofore used and which enable the degree of cooling and the temperature of the rims to be kept under accurate control. A further object is to provide a system which may utilize water of almost any quality as the cooling medium without encountering difficulty due to accumulation of scale and solid deposits of various sorts.

The apparatus of my invention, in general, comprises an annular friction rim having an exterior surface which may be cooled and an interior surface for frictional engagement with clutching or braking means, means for directing a stream of liquid in the form of a spray onto the exterior surface of the rim to cool the same and to dissipate the heat generated by frictional engagement of the clutching or braking elements with the interior surface, and an annular shield surrounding the rim and operative to collect liquid thrown off the rim by centrifugal force and to carry it to an appropriate point for disposal. In the preferred embodiments of the invention, the apparatus also includes cooperating parts on the shield and on the friction rim which serve to exclude liquid from the interior of the rim.

The improved method utilizing this apparatus and details of a suitable manner of placing the invention in actual use are set forth in the ensuing description, which is clarified by reference to the accompanying drawings illustrating preferred forms of the apparatus. In the drawings, Figure 1 is a vertical section showing an application of the invention to a combined belt pulley and clutch mechanism.

Figure 2 is an end elevation of the construction shown in Figure 1.

Figure 3 is an exploded perspective view illustrating the principal operating parts of the construction of Figures 1 and 2.

Figure 4 shows another embodiment of the invention in which it is applied to another type of revolving friction rim.

Among the several types of gyratory centrifugal machines used in the separation of granular solids from liquid, as in the manufacture of sugar, are machines which are driven individually from a common line shaft by means of a quarter-turn belt passing over a pulley on the line shaft and a pulley mounted on the vertical spindle of the centrifugal. In Figures 1, 2 and 3 I illustrate a pulley construction of the kind used on the line shaft in the described driving arrangement, and this pulley is shown in combination with clutching means for establishing a drive transmitting connection between the pulley and the line shaft and improved cooling means for cooling the friction rim of the clutch.

In accordance with usual practice, the belt pulley 10 consists of two mating pulley sections 12 and 14, which are locked together and together form the pulley rim, a central hub 16 and a supporting spider 18 connecting the pulley rim and hub. Pulley 10 is mounted on a line shaft 20 for revolution independently of the shaft. The transmission of driving torque from shaft 20 to pulley 10 takes place through clutching means of any suitable type, the clutching means shown in the drawings being of a form which I have found especially desirable and which is described in detail in my United States Letters Patent No. 1,884,873, granted October 25, 1932. Since the clutching means as such forms no part of the present invention, it suffices to point out that it consists generally of a plurality of clutch shoes, such as shown at 22, each pivotally secured intermediate its ends to an arm 24 that is fulcrumed at one end and connected with actuating linkage at another so that it is responsive to centrifugal forces created during rotation of the parts. The fulcral support for arm 24 and for the actuating linkage comprises a radial spider 26 which is keyed to the line shaft 20, as at 28. The said actuating linkage is connected with an axially slidable collar 30, also keyed to the line shaft as at 32, and it is arranged so that movement of collar 30 toward the pulley forces arm 24 and shoe 22 toward a friction rim, and movement of collar 30 away from the pulley retracts these parts from the friction rim and thereby interrupts driving engagement therebetween.

In the illustrated form of construction the clutch shoes cooperate with an annular friction rim 34 which consists of two mating semi-annular sections 36 and 38 and, when assembled, is locked to the pulley spider 18, for example, by an annular tongue 40 formed on the rim to seat within an annular groove 42 in a part integral with the spider and by a series of bolts 44 passing through these parts.

It will be understood that engagement of the clutch shoes with the friction rim, while the line shaft and clutch shoes are revolving at a high speed and the pulley and clutch rim are stationary or substantially stationary, results in acceleration of the pulley to the speed of the line shaft and that slippage occurs between the clutch shoes and the friction rim during the acceleration. The heat generated by this slippage, prior to my present invention, usually has been dissipated by air cooling of the rim. Cooling by circulation of air around the rim, however, does not take place quickly, and when operating the apparatus at higher than ordinary speeds and accelerating it to such speeds with unusual rapidity, air cooling of the friction rim is entirely inadequate and considerable difficulty arises through overheating and burning out of pads on the clutch shoes.

I overcome this problem of excessive heating of the friction rim and clutch shoes and at the same time avoid practical limitations of known liquid cooling constructions by providing the rim 34 with a surrounding annular shield 50, directing a spray of cooling liquid, such as water, onto the exterior surface of the rim, collecting the liquid expelled from the rim in the shield 50, and disposing of the used liquid in an appropriate manner. In the form of construction illustrated in the drawings, shield 50 comprises a pair of mating semi-annular sections 52 and 54 and an annular part 56 which cooperates with the semi-annular shield sections and the clutch rim 34 to prevent passage of liquid to the inside surface of the rim. In their assembled position surrounding the clutch rim, shield sections 52 and 54 are fastened together by suitable means, as at 58 and 60, and the shield is held in proper spaced relation to the rim 34 by appropriate mounting means, for example, a yoke-like bracket 62 having arms 64 and 66 secured to shield section 54 and a base 68 secured to supporting framework or the like. The side of the shield adjacent pulley 10 terminates in a circular edge 70, and member 56 is fastened to this edge, for example, by screws. As shown, member 56 includes an inwardly extending portion forming a U-shaped annular channel 72 that opens radially outwardly with respect to the axis of the shield. It cooperates with a laterally extending annular flange 74 formed on a part 76 of the friction rim 34 which extends radially beyond the interior surface thereof. The side of shield 50 away from pulley 10 embodies a radially inwardly extending portion forming an annular U-shaped channel 78, which faces radially outwardly in substantially the same manner as channel 72 and cooperates with a laterally extending flange 80 on an adjacent portion of the friction rim. Flange 80 projects from a part 82 of the friction rim which extends beyond the interior face of the rim.

Shield 50, at any desired point about its periphery, is provided with a lateral bore 84 communicating at one end with a conduit 86 for the introduction of a suitable cooling liquid and at the other end with a plurality of smaller bores 88 which are directed toward the adjacent exterior surface of the clutch rim. Liquid is introduced under pressure into bore 84 from conduit 86 and a spray of liquid is projected against the surface of the rim. As the rim is revolved excess liquid is expelled therefrom by centrifugal force, collected by shield 50 and carried by gravity to the bottom of the shield, from which it may be withdrawn through exit port 90, and then disposed of as desired. The constant projection of a liquid spray onto the revolving rim keeps a constantly renewed film of liquid on the exterior surface of the rim, and this film prevents the rim from attaining a temperature substantially greater than the boiling point of the liquid. In actual operation using a spray of water at ordinary temperatures as the cooling liquid the rim is maintained at a temperature considerably lower than 212° F. The temperature of the rim can be kept under accurate control and can be varied in accordance with particular working requirements by selection of the rate of flow of the cooling medium or of its temperature. I can employ saturated vapor containing droplets of liquid, such as wet steam, as the cooling medium and thereby keep the rim constantly at a temperature of approximately 212° F., utilizing the high latent heat of evaporation of films of the water from the rim for the cooling effect. Any of these practices ensures against damage to the friction pads which otherwise would occur from overheating of the parts. It will be understood that the spray may be directed against the rim from several locations instead of a single location as illustrated, but I have found the illustrated arrangement entirely sufficient for most practical purposes.

The channels 72 and 78 on the shield 50 and laterally extending flanges 74 and 80 on the rim constitute an effective means for preventing the passage of liquid to the inside of the rim. Any liquid passing to the channels is collected by them and carried to the bottom of the shield, where it passes off with the rest of the liquid. Should liquid overflow the channel before it reaches the bottom of the shield, it contacts the adjacent extended parts of the rim and is immediately thrown back into the shield by centrifugal force. If the spray from bores 88 is continued when the pulley and rim are at rest, the liquid flows freely around the exterior surface of the rim and passes out the exit port 90 without in any way coming into contact with operative parts of the clutch mechanism.

Another embodiment of my invention is illustrated in Figure 4, in which are shown an annular friction rim 100 mounted for revolution on a shaft 102 and presenting an interior friction surface 104 and an exterior cooling surface 106, for engagement with a typical friction pad 108, and means for directing a spray of cooling liquid against the exterior of the rim and for collecting and conducting away used liquid. Surface 106 preferably is ridged to provide greater surface for heat exchange. As in the embodiment of Figures 1 to 3, a shield 110 surrounds the rim and is spaced therefrom, and spray delivering means, consisting of a lateral bore 112 for receiving liquid under pressure from a conduit 114, and a plurality of communicating small spray bores 116 for directing spray jets onto surface 106, is formed in the shield. An exit port 118 in the shield serves to dispose of used liquid.

The form of construction shown in Figure 4 also includes cooperating means on the friction rim and shield for preventing access of liquid to the interior of the rim. For example, opposite sides of the shield have inwardly extended portions or flanges forming outwardly opening U-shaped annular channels 120 and 122, respectively, and adjacent portions of the friction rim have laterally extending flanges 124 and 126, respectively, which overlie these channels at points beyond the interior surface 104 of the rim. The operation of this form of construction is substantially the same as that of the form illustrated in Figures 1 to 3.

It will be understood that my improved liquid cooling practice may be utilized to advantage for the cooling of either brake or clutch rims wherever associated with internal friction pads or shoes. Thus the apparatus shown in Figure 4 might be adapted for braking purposes by securing rim 100 to shaft 102 and using friction pads 108 to stop rotation, or for clutching purposes by connecting the pads with shaft 102 and the rim with mechanism to be driven from the shaft. In either event, when the mechanism is employed to effect abrupt changes in the speed of heavy machinery a large amount of heat is generated by frictional engagement between the pads and the interior surface of the rim, and my improvements enable this heat to be dissipated effectively and economically.

An important advantage of my invention is that it makes it practicable to install liquid cooling means on machinery operated in localities where the available supply of cooling liquid consists of water of very low quality. Even though the water contains sediment or deposit-forming ingredients which would prevent its use in closed circulating systems, it presents no difficulties when used with my improvements. There is no possibility for objectionable accumulation of scale or sedimentary material in or on operative parts of the machinery, such material reaching the friction rim being thrown off immediately by the centrifugal force of revolution.

Details of particular embodiments of my invention have been shown in the drawings and described herein merely for purposes of illustration. I realize that these details may be varied without departing from objects of the invention or its essential characteristics, and I intend the invention to be given a scope commensurate with the spirit of the specification as limited only by the requirements of the claims.

I claim:

1. A liquid-cooled friction rim construction comprising an annular friction rim having an exterior surface and an interior surface for frictional engagement with clutching or braking elements, means mounting said rim for rotation about its axis, means for directing liquid onto said exterior surface to cool the rim, and stationary means surrounding the exterior surface of said rim for collecting and conducting away liquid expelled centrifugally therefrom during revolution of the rim, said rim being operative to direct all liquid delivered onto the exterior surface while the same is at rest into said stationary collecting means.

2. A liquid-cooled friction rim construction comprising an annular friction rim having an exterior cooling surface and an interior surface for frictional engagement with clutching or braking elements, means mounting said rim for rotation about its axis, means for directing a stream of liquid onto said exterior surface to cool the rim, an annular shield surrounding the rim, cooperating means on said shield and rim operative to exclude liquid from the interior of the rim, and means for discharging liquid from said shield.

3. A liquid-cooled friction rim construction comprising an annular friction rim having an exterior cooling surface and an interior surface for frictional engagement with clutching or braking elements, means for directing a stream of liquid onto said exterior surface to cool the rim, an annular shield surrounding the rim, laterally extending flanges on said rim beyond said interior surface, said shield having spaced side portions enclosing said flanges and forming outwardly opening annular channels inside the same, and an exit port in said shield for discharging liquid therefrom.

4. A combined belt-pulley and liquid-cooled clutch rim construction comprising a pair of mating sections forming an annular pulley, a central hub and a web connecting the hub and pulley, a pair of mating semi-annular clutch rim sections removably secured together and to said web and forming a rim having an exterior cooling surface and an interior surface for frictional engagement with clutching elements, a pair of mating semi-annular shield sections secured together and mounted in surrounding and spaced relation to said rim, means in one of said shield sections for receiving liquid under pressure and directing a spray of the same against said exterior surface, cooperating means adjacent the sides of said rim and shield operative to exclude liquid from the interior of the rim, and means for discharging liquid from said shield sections.

5. In combination, for a centrifugal machine or the like, a driven shaft, a clutch for transmitting power from said shaft to the machine to drive the machine at high speeds, said clutch comprising a friction rim having a free exterior surface and an interior surface cooperating with friction clutching means on said shaft, means adjacent said exterior surface for directing liquid against the same while the rim is revolving to keep said exterior surface moist with a film of liquid, a shield surrounding the rim to collect liquid expelled centrifugally from said exterior surface, and a discharge outlet communicating with the lower part of said shield for conducting excess liquid therefrom.

EUGENE ROBERTS.